Sept. 11, 1962  F. M. CAIN, JR  3,053,743
METHOD OF MAKING A COMPARTMENTED NUCLEAR
REACTOR FUEL ELEMENT
Filed March 24, 1958  2 Sheets-Sheet 1
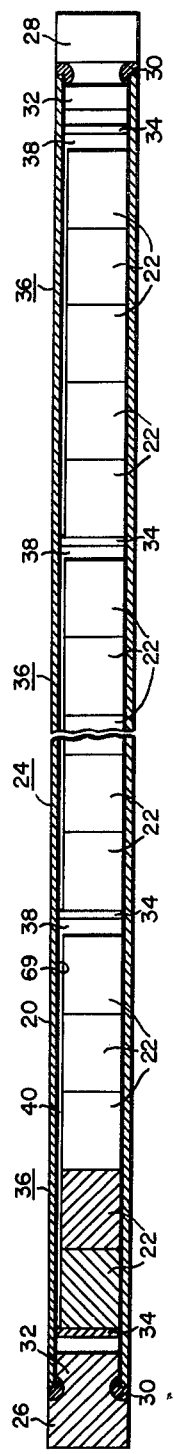
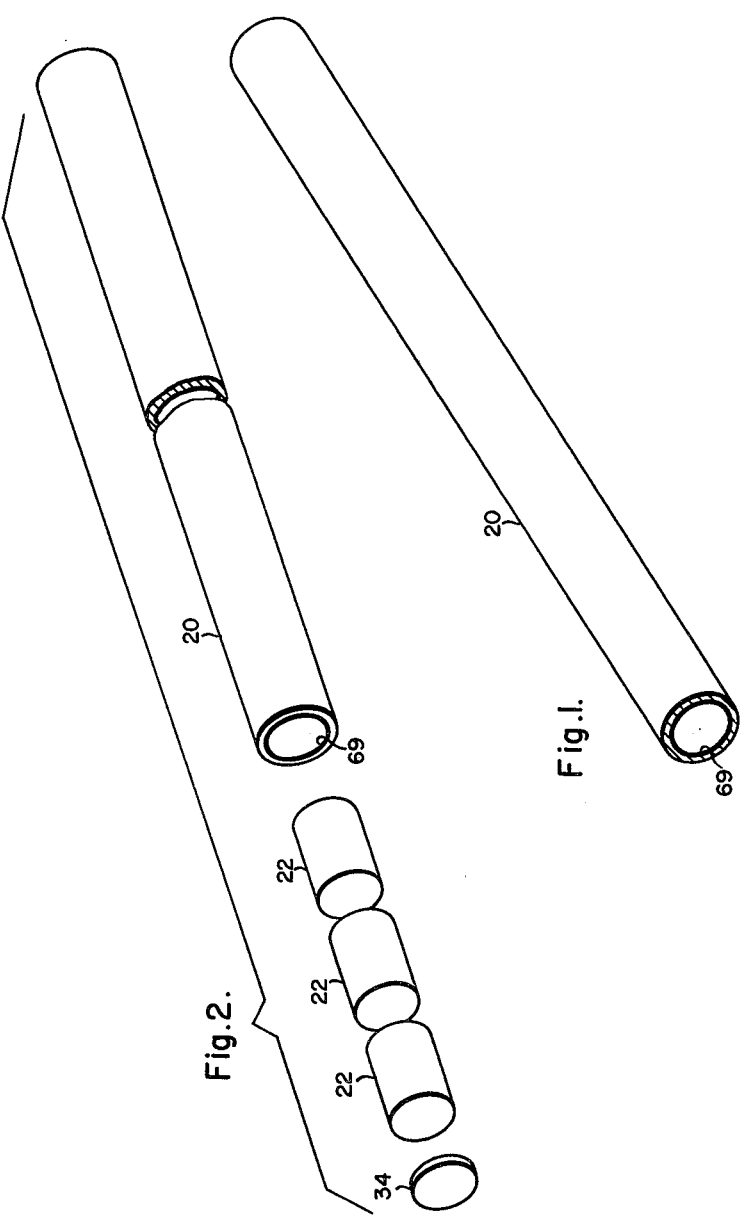
INVENTOR
Francis M. Cain, Jr.
BY
Donald J. Smith
ATTORNEY

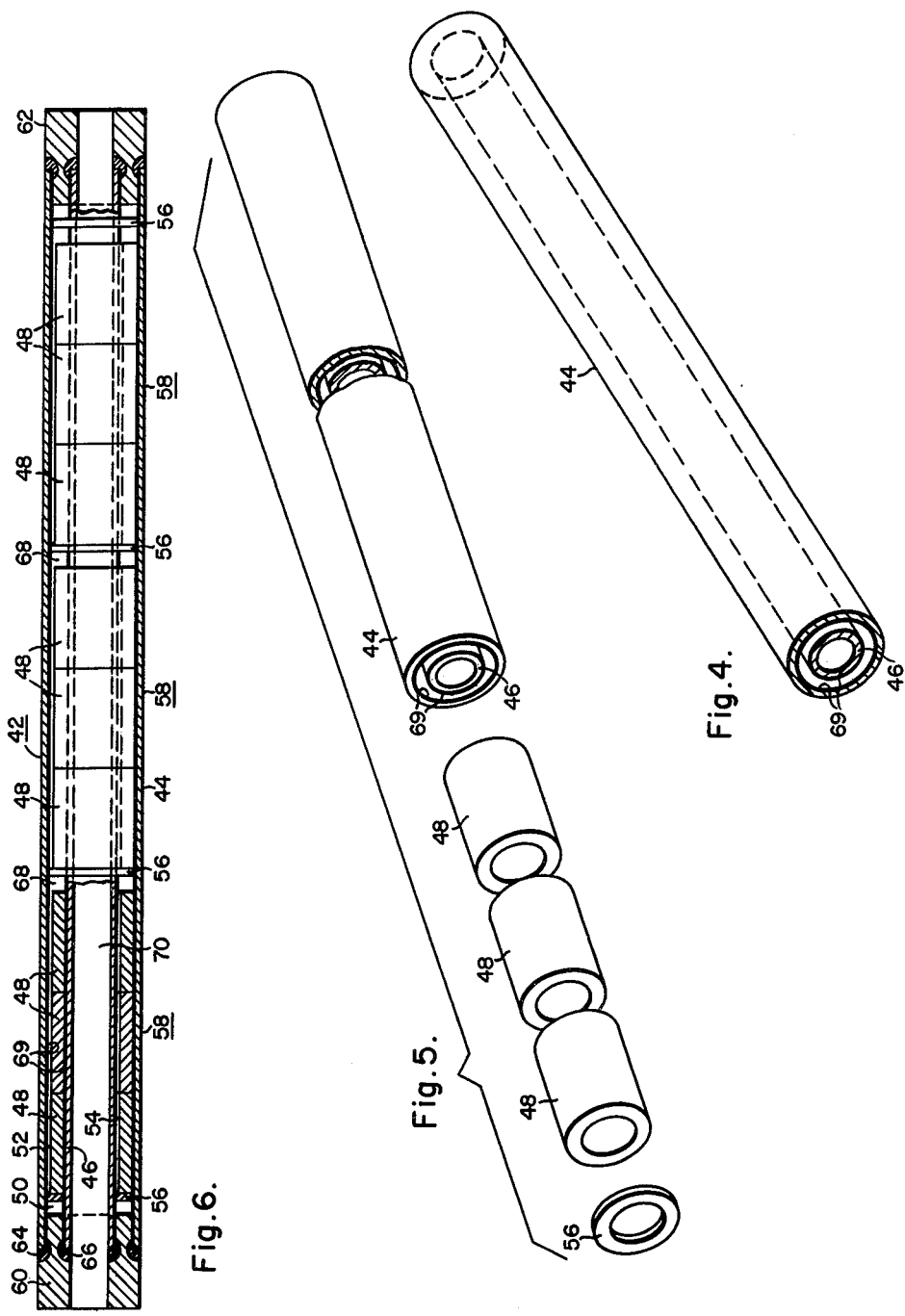

United States Patent Office 3,053,743
Patented Sept. 11, 1962

3,053,743
METHOD OF MAKING A COMPARTMENTED NUCLEAR REACTOR FUEL ELEMENT
Francis M. Cain, Jr., Apollo, Pa., assignor, by mesne assignments, to the United States of America as represented by the United States Atomic Energy Commission
Filed Mar. 24, 1958, Ser. No. 723,422
1 Claim. (Cl. 204—154.2)

The present invention relates to a fuel element assembly for neutronic reactors and more particularly to a fuel assembly adapted for use in a pressurized water heterogeneous type reactor.

The fuel element disclosed herein is adapted for use in a neutronic reactor wherein a quantity of one or more of the fissionable isotopes $U^{233}$, $U^{235}$ and $Pu^{239}$ is caused to undergo a chain reaction. The chain reaction is propagated by neutrons having a specific range of velocities depending upon the type of reactor in which the fissionable material is employed.

In a thermal-type reactor the chain reaction is propagated by neutrons having velocities equivalent to thermally excited hydrogen ions or about 2500 meters per second. A neutronic reactor of this character usually employs the $U^{233}$ or $U^{235}$ isotopes or both of uranium to propagate the reaction. However, during the fissioning of each of these atoms, which, of course, results in two approximately equal fission fragments, an average of approximately three neutrons is expelled. However, most of these neutrons have velocities in the fast region, that is to say in excess of 10,000 meters per second. Therefore, in order to propagate the chain reaction in a thermal reactor, it is necessary to employ a neutron slowing material, termed a moderator, to slow the fast neutrons to the thermal velocity region. Suitable moderator materials are carbon, hydrogen, and deuterium, or materials containing these elements such as graphite, light water, deuterium oxide or heavy water, and radiation-stable organic materials, such as the multi-phenyls.

The thermal-type reactor may be constructed in the form of a lattice network of uranium or an alloy thereof containing one of the fissionable isotopes and provided with coolant passages for the circulation of a suitable cooling medium such as water or carbon dioxide. Alternatively, the nuclear fuel material can be suspended in spaced relation in a pressurized vessel, and light or heavy water can be utilized both as a cooling medium and as a moderator material, with suitable circulating loops being employed to maintain a flow of the moderator-coolant through the vessel to remove the heat developed by the chain reaction. Suitable heat exchanging means are disposed in the aforementioned circulating loops in order to convert into steam the water applied to the heat exchanger from one or more secondary or thermodynamic loops.

As stated previously, the aforementioned coolant-moderator, in certain applications, can be either light or heavy water, with light water being the more efficient moderator material due to the lighter weight of the hydrogen nuclei. On the other hand, the use of heavy water is applicable in those cases wherein it is necessary to minimize the parasitic absorption of fissional neutrons within the reactor system as a result of peripheral and structural neutron losses. Heavy water is advantageous in this application in that it has a much smaller neutronic capture cross-section than that of light water.

The peripheral loss of neutrons from the chain reacting system is minimized by providing a neutronic reflector system adjacent the periphery of the system or adjacent the inner walls of the containment vessel. This reflector can take the form of a layer or graphite disposed adjacent the inner wall surface of the vessel or of a water chamber or annular space usually reserved for this purpose between the outer periphery of the reactor core structure and the inner wall of the reactor vessel. When light or heavy water is employed as a coolant, this annular space, of course, is filled with the water and thus serves as a neutronic shield or reflector.

Another form of neutronic reactor is typified by the so-called epithermal reactor. In this reactor a quantity of at least one of the aforementioned fissionable isotopes are subjected to a chain reaction maintained by neutrons within the epithermal region, that is to say, neutrons having velocities between 2500 and 10,000 meters per second. In this form of reactor, the nuclear fuel or fissionable material is relatively closely spaced in order to lessen the moderating capacity of the moderator material. This form of reactor is particularly applicable for the fissioning of plutonium 239 which is fissionable most efficiently by neutrons in the higher velocity ranges.

The thermal or epithermal-type reactors are controlled by means of so-called control rods which are insertable through the reactor vessel into the reactor core. These control rods each contain a relatively good neutron-absorbing material, such as boron, hafnium and gadolinium, and by variable absorbing the neutrons produced by the chain reaction, depending upon the position of the control rods relative to the reactor core, the propagation of the chain reaction to the reactor core, can be carefully controlled.

In any of the aforementioned reactor systems, a fertile or "blanket" material, such as uranium 238 or thorium 232, can be mixed or intermingled with the previously mentioned fissionable materials or otherwise disposed within the reactor vessel at positions adjacent to the fissionable isotope. The fertile materials, when thus used, absorb those neutrons which are not required for the propagation of the chain reaction and in doing so are transmuted into certain ones of the fissionable isotopes. For example, during neutronic radiation, atoms of the fertile material uranium 238 when employed are converted into the fissionable transuranic element plutonium 239 in accordance with the following nuclear equations:

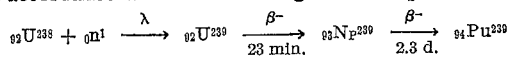

with the times denoted in connection with the latter two reactions being the half-lives of the decaying isotopes. The plutonium 239 isotope is produced in either of the thermal reactor wherein the initial core loading consists of natural or source-grade uranium, which may be enriched with one of the aforementioned fissionable isotopes, or disposed adjacent to a quantity of the fissionable isotope in the form of a "seed"; or in the so-called fast breeder type reactor wherein the initial core loading consists of natural uranium and a quantity of the plutonium 239 isotope.

On the other hand, the artificial fissionable isotope $U^{233}$ is obtained when thorium 232 is employed as the fertile or blanket material in a thermal or epithermal type reactor. The $U^{233}$ isotope is formed as a result of the following series of nuclear reactions:

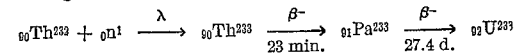

The artificial fissionable isotope $U^{233}$ and the transuranic isotope $Pu^{239}$ have half-lives of 163,000 years and 24,000 years, respectively, and therefore are relatively stable in this respect.

The neutronic reactor reaches criticality when each succeeding generation of fissions of the chain reaction is exactly equal in number to that of the preceding generation. At this point the effective constant of criticality ($K_{eff}$) is equal to unity and as a result, of the average of three neutrons yielded in each fission, only approximately one of these neutrons is employed to propagate the chain reaction, and the remainder of the neutrons are absorbed by the aforementioned fertile materials, by the moderator and coolant materials and by the structural components of the reactor system.

Control of neutronic reactors is made feasible by the phenomenon of delayed neutrons. It has been found that an average of about 2.8 to 2.9 of the 3.0 fission neutrons are emitted immediately upon fissioning of each chain-reacting atom. The delayed neutrons are emitted up to about 12 minutes after the fission process. Although only abou 3 to 7% of the total neutrons emitted as a result of atomic fission are delayed neutrons, the time-margin provided by these delayed neutrons is sufficient to permit adjustment of the control rods to maintain the chain reaction approximately at the point of criticality during operation of the reactor. Otherwise, a tendency to an increase in the number of fissions from one generation to the next in the chain reaction would be multiplied almost instantaneously.

A more detailed description of the theory and operation of neutronic reactors are given in Patent Nos. 2,708,656 and 2,798,847, issued May 17, 1955 and July 9, 1957 to Enrico Fermi and Leo Szilard, and entitled "Neutronic Reactor" and "Method of Operating a Neutronic Reactor," respectively.

The fuel element disclosed herein is similar in size and in content of fissile material to the fuel element described and claimed in a copending application of R. K. McGeary et al. entitled "Fuel Element for a Neutronic Reactor," Serial No. 721,776, filed March 18, 1958, and assigned to the present assignee. Accordingly the fuel element of the present invention is adapted for assembly and application as described in connection with the fuel element assemblies and the reactor systems incorporated by reference in the aforesaid McGeary et al. application.

In order to protect the fissionable material from the corrosive effects of the high temperature pressurized water utilized in the coolant system for neutronic reactors of the character described herein, it is necessary to encase the fissile isotopes within a suitable corrosion resistant cladding material. Because of the large number of fuel rods utilized within a typical reactor, the cladding material desirably is selected from a structural material having a low neutronic absorption cross section. Additionally, in practicing a preferred method of making the fuel element of the invention, the cladding material desirably is selected from one having a coefficient of expansion which is less than that of the fissile material.

The fuel rods employed in present or proposed pressurized water reactors and similar heterogeneous type reactors frequently are provided with a length in the neighborhood of 10 feet and with an outside diameter of about 0.3–0.4 inch. As described more fully hereinafter, these fuel rods comprise an elongated tubular element fabricated from a corrosion resistant material, in the case of water cooled reactors, such as zirconium, a zirconium alloy, stainless steel, or an aluminum alloy. The use of a zirconium alloy is desirable, however, because of its lower neutronic capture cross section and because of its thermal expansion properties. A suitable zirconium alloy for this purpose is described and claimed in Patent No. 2,772,964, issued on December 4, 1956, to D. E. Thomas et al., and assigned to the present assignee.

The aforementioned cladding tubes are then substantially filled with a quantity of the aforementioned fissile materials or combinations thereof. For example, this fissle material can be furnished in the form of uranium oxide ($UO_2$) fabricated into relatively short right-cylindrical pellets by compacting a pulverulent form of the oxide followed by sintering and grinding. In grinding the pellets, the outer diameter thereof is formed such that the pellets fit relatively closely within the cladding tube with diametric clearances of the order of three to six mils. These clearances are necessary to permit facile insertion of the pellets within the tube in order to form a column of pellets extending therethrough. Moreover, during operation of the reactor the pellets, being at a higher temperature than the cladding tube which is in contact with the coolant flowing through the reactor, expand to a greater extent and therefore the aforesaid clearances permit longitudinal movement of the pellet column relative to the cladding tube. The temperature difference between the central portions of the fuel pellets and the cladding tube is amplified by the aforesaid diametric clearances of the fuel element. However, the clearances must be large enough that relative radial expansion of the pellets, that is to say, in a direction transversely of the tube walls, will not cause binding between one or more of the pellets and the cladding tube. Moreover, the accumulation of chips and particles of the reactor fuel and other debris in these clearances, occasioned by cyclic operation of the reactor, may eventually prevent gross movement of the entire fuel pellet column due to binding between one or more fuel pellets and the adjacent wall of the cladding tube. Consequently the tube at this time would buckle or otherwise become distorted as the column continues to expand longitudinally.

To permit differential expansion of the fuel pellets in the longitudinal direction in known types of fuel elements a void has been established usually at one end thereof. In a pressurized water reactor, however, the pressures encountered during operation thereof dictate t' ; use in a relatively thicker cladding tube to prevent collapse of the aforementioned void. In a typical pressurized reactor utilized for power purposes, this pressure may reach a value of 2500 pounds per square inch during operation of the reactor and 3750 p.s.i during pre-operational testing. If the length of the void exceeds the diameter of the cladding tube, collapsing will occur in the area of the void unless the cladding tube is made sufficiently strong to withstand this pressure. As a result, the drawing techniques employed in fabricating the cladding tubes necessitate making the entire tube wall thicker than that required merely for supporting the fuel rod. The use of additional cladding material, which must be corrosion resistant in the case of pressurized water reactors, not only involves greater initial expense, but moreover is detrimental to neutronic economy of the reactor system.

However, if the unsuported length of the void can be reduced, resistance to collapsing increases and it is possible to utilize fuel rods having thinner cladding. The usage of a thinner cladding material is made feasible by the present invention as described hereinafter. As a result, the present invention affords an improvement in neutronic economy of the reactor in addition to other advantages numerated hereinafter, by permitting the use of a lesser amount of expensive cladding material.

This problem is obviated in accordance with the present invention by providing the fuel element with a series of compartments extending longitudinally thereof in a manner presently to be described. By use of these compartments the aforementioned void is divided, in one form of the invention, into a plurality of shorter spaces formed respectively in the compartments and collapse of the fuel element in the area of the aforementioned void is prevented. The use of shorter spaces or voids increases the pressure which the cladding tube can withstand, which, of course, is dependent upon the longitudinal length of each void or space of the cladding tube which is unsupported by fuel pellets. Moreover, the division of the fuel pellet column in this manner eliminates the aforesaid gross movement of the fuel column thereby obviating buckling or other distortion of the cladding tube. It has been found that the fuel columns in the neighborhood of approximately ten inches in length, assuming the dimensions enumerated hereinafter, that the distortional effects caused by differential expansion between the relatively shorter fuel columns and the adjacent portions of the cladding tube are negligible.

In a preferred arrangement of the invention, the compartmented fuel element of the invention has the additional advantage that the individual compartments thereof are hermetically sealed one from another. Thus, a rupture in the cladding tube wall will, in all probability, expose the contents of only one compartment of the fuel element to the surrounding reactor coolant. It follows, then, that only a small fraction of the dangerously radioactive fissional products contained within the fuel element is released to the primary reactor coolant system.

Another disadvantage of known fuel elements of this character is that they must be furnished with a relatively small diameter in order to secure adequate heat transfer surface. Thus, in prior fuel elements which were formed with an outer diameter in the order of .3 to .4 inch the central portion of the fuel pellet may reach 2500° F. during operating conditions of the reactor, assuming the temperature of the reactor coolant is in the neighborhood of 550° F. For these conditions the average temperature of the fuel pellet may be about 1800° F. The available heat transfer surface of a fuel element containing a given mass of nuclear fuel is increased in accordance with the invention as described hereinafter.

In view of the foregoing, an object of the present invention is the provision of a novel and efficient fuel element adapted for use in a neutronic reactor.

Another object of the invention is to furnish a novel and improved method for fabricating a reactor fuel element.

Further objects of the invention are to facilitate passage of coolant flowing between adjacent fuel elements and to minimize the spacing required for adequate coolant flow therebetween.

Still another object of the invention is to provide a fuel element of the character described wherein means are provided for increasing the rate of heat transfer from the interior thereof to the outer surface of the fuel element.

A still further object of the invention is the provision of a compartmented fuel element and method for making the same.

Still another object of the invention is the provision of a fuel element having novel means for spacing the fuel pellets thereof in discrete groupings.

Yet other objects of the invention are the provision of a fuel element having novel means associated therewith for minimizing the escape of radioactivity therefrom in the event of rupture and for improving the heat transfer characteristics thereof.

These and other objects, features and advantages of the invention will be elaborated upon in the forthcoming description of illustrative forms thereof with the description being taken in conjunction with the accompanying drawings, wherein:

FIGURE 1 is a perspective view of one form of cladding tube adapted for use with the fuel element illustrated in FIGS. 2 and 3, with a portion of the tube being broken away for purposes of illustration;

FIG. 2 is a partial exploded view of one form of reactor fuel element arranged in accordance with the invention;

FIG. 3 is a longitudinally sectioned view of the final form of the fuel element illustrated in FIG. 2;

FIG. 4 is a perspective view of a cladding tube adapted for use with another form of fuel element, which is illustrated in FIGS. 5 and 6, with a portion thereof being broken away for purposes of illustration;

FIG. 5 is a partial exploded view of another form of reactor fuel element, arranged pursuant to the invention; and FIG. 6 is a longitudinally sectioned view of the final form of the fuel element shown in FIG. 5.

Referring more particularly to FIGS. 1 to 3 of the drawings, the illustrative embodiment of the invention shown therein comprises a cladding tube 20 and a plurality of fuel pellets 22 forming the essential components of a fuel element denoted generally by the reference character 24. The fuel pellets 22 are inserted into the cladding tube 20, as illustrated in FIG. 3 of the drawings, and when thus inserted, the fuel pellets are hermetically sealed within the cladding tube 20 by a pair of end plugs 26 and 28, which are joined and sealed to the ends respectively of the cladding tube 20 by the annular welds 30. Each of the end plugs 26 and 28 is provided with a necked-down or shouldered portion 32, whereby the plug is inserted into the open end of the cladding tube 20 in order to afford a smooth outer contour to the fuel element 24.

Within the cladding tube 20 the fuel pellets 22 are divided into discrete groupings through the use of spacing discs 34. The spacing discs 34 are inserted into the cladding tube 20 with the fuel pellets 22 and thus divide the fuel element 24 into a plurality of individual compartments denoted by the reference characters 36. The spacing discs 34 are joined and hermetically sealed to the inner wall surface of the cladding tube 20 in a manner described hereinafter in order to hermetically seal each of the compartments 36. Therefore, should a rupture occur in the wall of the cladding tube 20, only the contents of that compartment 36, which is adjacent the rupture, will escape into the reactor coolant system.

When the fuel element 24 is assembled in accordance with the invention, a differential expansion space 38 is formed in each compartment at room temperature in order to permit expansion of the fuel pellets 22 relative to the cladding tube 20. However, since the length of the spaces 38 in the longitudinal direction of the cladding tube 20 is less than the diameter of each space 38, collapse of the tube wall adjacent the spaces 38 will not occur during the aforementioned reactor operating conditions. Accordingly, a thinner walled cladding tube 20 can be utilized with this arrangement than would be the case if the expansional space were accumulated at one end of the fuel element as in known arrangements of fuel elements. The spaces 38 are obtained for example, in a manner described hereinafter in connection with the method of fabricating the fuel elements disclosed herein.

A diametric clearance 40 is provided between the individual fuel pellets 22 in the adjacent inner wall of the cladding tube 20 in order to permit movement of the fuel pellet column in each compartment 36. However, because the fuel element 24 is compartmented any binding action between any one of the fuel pellets 22 of each compartment 36 and the inner wall of the cladding tube will not cause distortion of the cladding tube 20 since the area of the aforesaid binding cannot be subjected to gross movement expansion of the entire fuel pellet column but only to the differential expansion of a single group of pellets 22 contained within a given compartment. Before sealing the ends of the cladding tube 20 with the end plugs 26 and 28 and before sealing the spacing discs 34 to the cladding tube 20, the fuel element 24 is filled with a heat transfer gas such as helium in order to facilitate the transfer of heat across the diametric clearances 40 of the fuel element 24.

Referring now to FIGS. 4 to 6 of the drawings, the fuel element illustrated therein is provided with means for increasing the heat transfer area thereof. In the latter arrangement of the invention a fuel element denoted by the reference numeral 42 is provided with an annular cross-sectional configuration. In furtherance of this purpose an outer cladding tube 44 and an inner cladding tube 46 are disposed in coaxial relation, and a plurality of annular fuel pellets 48 are inserted into the space enclosed therebetween. The radial thickness of the annular pellets 48 is slightly less than the annular space 50 between the coaxial cladding tubes 44 and 46 such that diametric clearances 52 and 54 are formed between each fuel pellet 48 and the cladding tubes 44 and 46, respectively.

When assembling the fuel element of FIGS. 4 to 6, a plurality of annular spacing washers 56 are inserted between the cladding tubes 44 and 46 in order to divide the fuel pellets column into discrete groupings. The washers 56 are joined and desirably sealed at their outer and inner peripheries to the cladding tubes 44 and 46, respectively, as described hereinafter, in order to divide the fuel element 42 into a plurality of compartments denoted by the reference characters 58. When thus assembled the ends of the cladding tubes 44 and 46 are closed and hermetically sealed by a pair of end plugs 60 and 62, respectively, which are each seal-welded to a pair of adjacent ends of the cladding tubes 44 and 46, by an annular weld 64 or 66, respectively. When completely assembled, an annular expansional space 68 is provided in each of the sealed compartments 58 similar to the spaces 38 described heretofore in connection with FIG. 3 of the drawings.

In fabricating the fuel element 24 (FIG. 3) or 42 (FIG. 6), the inside surfaces of the cladding tube 20 or 44 and the outside surface of the cladding tube 46 are coated as denoted by the reference numerals 69 with metallic nickel or a nickel-iron-chrome alloy, for example, by a well-known chemical plating method. In a preferred method of fabricating the fuel rods 24 and 42, the cladding tube 20 or the cladding tubes 44 and 46 are fabricated from the aforementioned zirconium alloy, while the spacing discs 34 or the spacing washers 56 are fabricated from type 304 (AISI) stainless steel. Thereafter, the pellets 22 and the spacing discs 34 are preassembled into the cladding tube 20 leaving a space of about one inch (not shown) at one end of the cladding tube 20, which space is sufficient for expansion of the UO$_2$ pellets employed in this example at the brazing temperature of nickel or the aforementioned nickel alloy or about 1850° F. In fabricating the fuel element 42, the annular pellets 48 and the spacing washers 56 are similarly assembled between the cladding tubes 44 and 46 leaving an annular space of about one inch (not shown) at one end thereof.

Following preassembly of the fuel elements 24 and 42, the end plugs 26 and 28 are joined and sealed to the cladding tube 20 in the manner described heretofore, and the end plugs 60 and 64 of the fuel element 42 also are assembled at this time. When the ends of the cladding tubes 20 or 44 and 46 are sealed in this fashion, the fuel element 24 or 42 is heated in a furnace at a temperature of about 1850° F. for a period of 30 to 60 minutes. To prevent oxidation of the cladding tubes, the fuel element is maintained in a vacuum within the furnace or in an inert atmosphere such as helium or nitrogen.

At the aforesaid temperature, the UO$_2$ pellets 22 or the annular pellets 48 will expand longitudinally of the fuel element 24 or 42, respectively, and thus automatically position the stainless steel partitions; that is to say, the spacing discs 34 or the spacing washers 56, respectively, to form the expansional space 38 or 68 in each fuel element compartment when the fuel element 24 or 42 has been cooled to room temperature. The expansion of the uranium oxide pellets 22 or 48 at the 1850° F. brazing temperature is sufficient to position the stainless steel partitions 34 or 56 in a manner to provide sufficient expansional spaces 38 and 68, respectively, to allow for the differential expansion of the pellets 22 or 48 at reactor operating temperatures.

In addition, the greater thermal expansion of the stainless steel partitions 34 or 56 in the radial distance thereof as compared to the aforesaid zirconium alloy tubes 20 or 44 and 46 will force the partitions 34 or 56 into intimate contact with the adjacent surfaces of the cladding tubes. At this temperature, of course, the nickel or nickel alloy brazing material coated on the cladding tubes as aforesaid is in a molten condition and thus forms a eutectic alloy with stainless steel at the edges of the partitions 34 and 56. When the fuel elements 24 and 42 are cooled, the eutectic alloy will freeze before intimate contact between the stainless steel partitions 34 and 56 and the respective cladding tubes 20, 44 and 46 can be terminated. Consequently, the partitions 34 and 56 will be brazed to the adjacent surfaces of the cladding tube 20 or 44 or 46, thereby hermetically sealing the compartments 36 or 58 from one another respectively.

In view of the foregoing, it will be apparent that novel and efficient forms of a neutronic reactor fuel element have been described herein. The fuel element of FIGS. 1 to 3 as aforesaid is adapted for use without change in reactor design or parameters in the reactor system incorporated by reference in the aforementioned copending application or R. K. McGeary et al. and obviously can be assembled into the fuel element assemblies denoted in the aforesaid McGeary et al. application. The fuel element 42 of FIGS. 4 to 6 likewise can be assembled into the aforementioned fuel element assemblies with slight modification which will be obvious to those skilled in the reactor art. It will be apparent, then, inasmuch as the fuel element 42 is provided with a central longitudinal flow passage 70 that the fuel element of FIG. 6 although larger in outside diameter can be more closely spaced within the fuel element assembly thereof due to the presence of the central coolant channel 70. Therefore, assuming that the mass of reactor fuel material is the same in the fuel elements 24 and 42, the coolant fluid which must be supplied thereto by the primary reactor system is substantially the same in quantity. However, the temperature gradient across annular fuel pellets 48 will not rise to as high a peak as that across the fuel pellets 22.

It is intended that the descriptive and illustrative materials employed or incorporated herein be construed as exemplifying the invention and not as limitative thereof.

Accordingly, numerous modifications of the invention will occur to those skilled in this art without departing from the spirit and scope of the invention.

Therefore, what is claimed as new is:

A method of making a fuel element for a nuclear reactor comprising, coating a metal cladding tube about ten feet long and with an outside diameter of about 0.3 to 0.4 inch on its inside wall with a nickel-iron-chrome brazing alloy which is molten at the average operating temperature of the fuel pellets in the reactor and hard at the operating temperature of the coolant of the reactor, inserting serially into the tube groups about ten inches long of cylindrical pellets of ceramic fissionable fuel and having diametric clearances of 3 to 6 mils with the tube and stainless steel spacing members between adjacent groups of pellets, said spacing members being of sufficient dimensions to form hermetic compartments within the tube, inserting sealing plugs at each end of the tube to leave a total void space of about one inch, heating from 30 to 60 minutes the tube and its contents to about the average operating temperature of the pellets in the reactor, so that the pellets will expand to their maximum dimensions at said average temperature thereby automatically positioning the spacing members along the tube, and cooling the tube and its contents to room temperature, whereby the spacing disks become permanently fixed at their edges in the brazing alloy and define a hermetically sealed compartment for each group of fuel pellets.

References Cited in the file of this patent
UNITED STATES PATENTS

| | | |
|---|---|---|
| 443,698 | Meyer | Dec. 30, 1890 |
| 978,846 | Carlisle | Dec. 20, 1910 |
| 2,798,848 | Kingdon | July 9, 1957 |
| 2,838,452 | West et al. | June 10, 1958 |
| 2,852,456 | Wade | Sept. 16, 1958 |
| 2,874,459 | Haldeman | Feb. 24, 1959 |
| 2,879,216 | Hurwitz et al. | Mar. 24, 1959 |
| 2,886,503 | Szilard et al. | May 12, 1959 |
| 2,890,158 | Ohlinger et al. | June 9, 1959 |
| 2,907,706 | Horning et al. | Oct. 6, 1959 |